United States Patent [19]

Gallaher

[11] Patent Number: 4,718,610

[45] Date of Patent: Jan. 12, 1988

[54] ICE SHAVER

[76] Inventor: Harold D. Gallaher, Bismarck, Mo. 63624

[21] Appl. No.: 776,780

[22] Filed: Sep. 17, 1985

[51] Int. Cl.$^4$ ............................................. B02C 18/12
[52] U.S. Cl. ....................................... 241/37.5; 241/92; 241/101.2; 241/280; 241/285 A; 241/DIG. 17
[58] Field of Search ............... 241/37.5, 92, 95, 101.2, 241/278, 280, 285 R, 285 A, DIG. 17

[56] References Cited

U.S. PATENT DOCUMENTS

| | | | |
|---|---|---|---|
| 2,477,474 | 7/1949 | Bert | 241/DIG. 17 X |
| 2,515,923 | 7/1950 | Hansen | 241/DIG. 17 X |
| 2,550,864 | 5/1951 | Rollman | 241/DIG. 17 X |
| 4,043,514 | 8/1977 | Peterson, Jr. | 241/285 BX |
| 4,394,984 | 7/1983 | Hight et al. | 241/DIG. 17 X |
| 4,575,012 | 3/1986 | Uphoff et al. | 241/DIG. 17 X |

Primary Examiner—Timothy V. Eley
Attorney, Agent, or Firm—Shoemaker and Mattare, Ltd.

[57] ABSTRACT

A device for shaving ice for making snow cones which includes an elongated housing, a base for supporting the housing upon a suitable platform, a pair of castings with one casting being stationarily mounted in the housing and the other one rotatably mounted therein, the rotatably mounted casting having a knife blade therewith for producing ice shavings from a block of ice, access structure provided with the housing to facilitate servicing of elements interiorly thereof, a weight for providing gravity bias to the block of ice, guiding and braking members for controlling the flow of the block of ice, and a discharge for receiving and dispensing the shaved ice.

31 Claims, 42 Drawing Figures

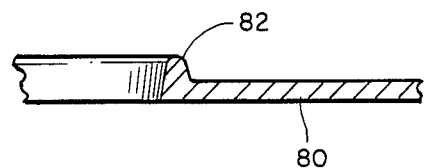
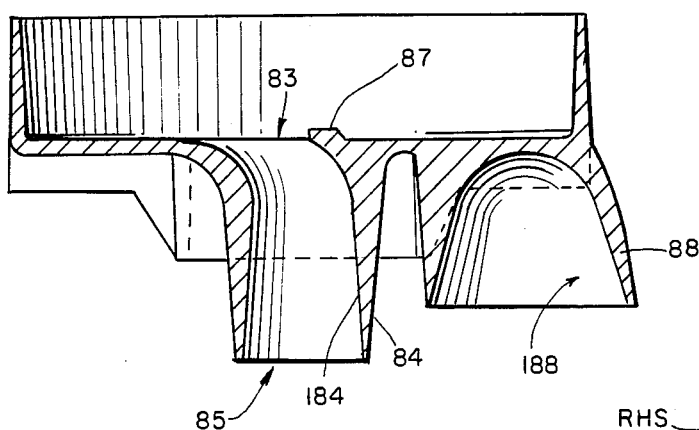
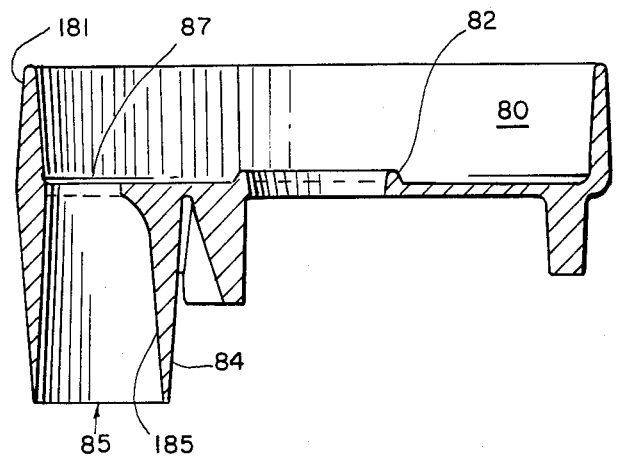
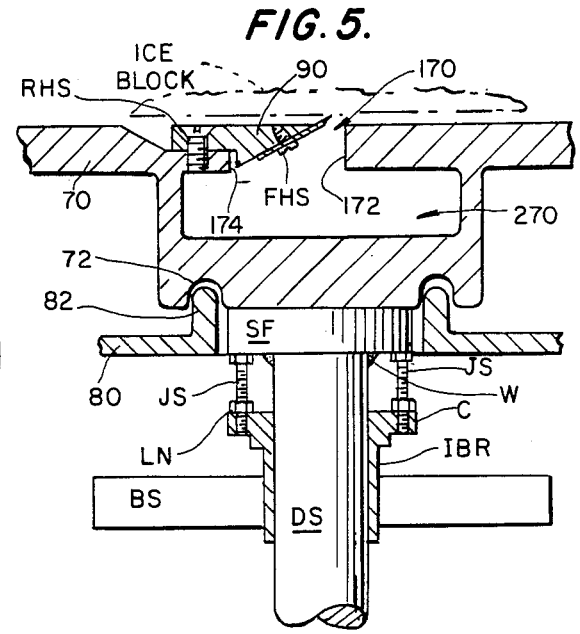
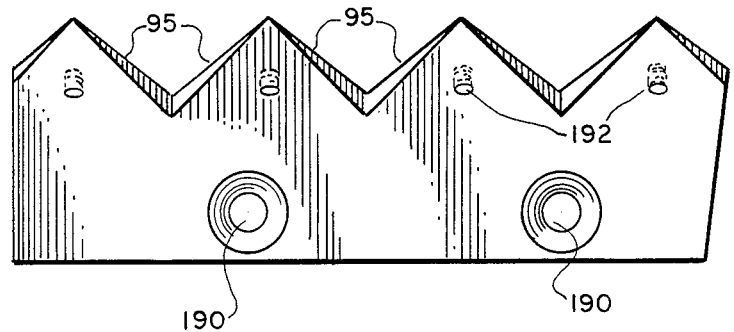
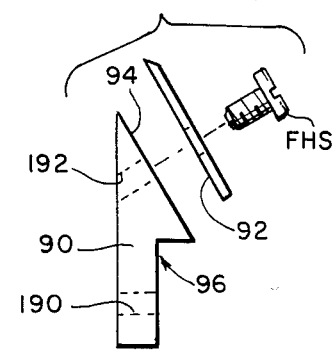

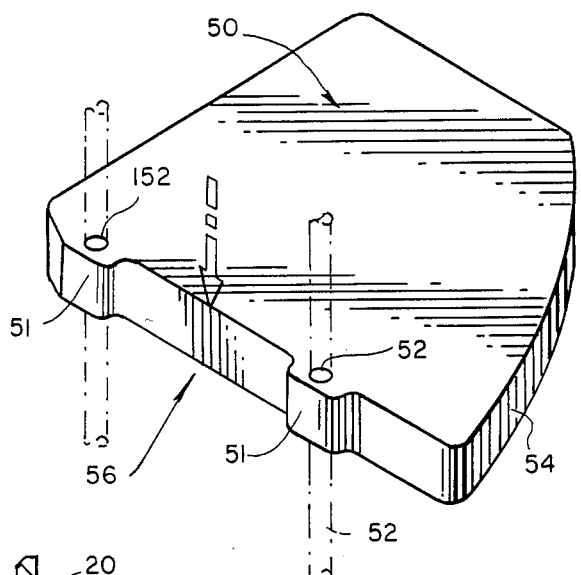
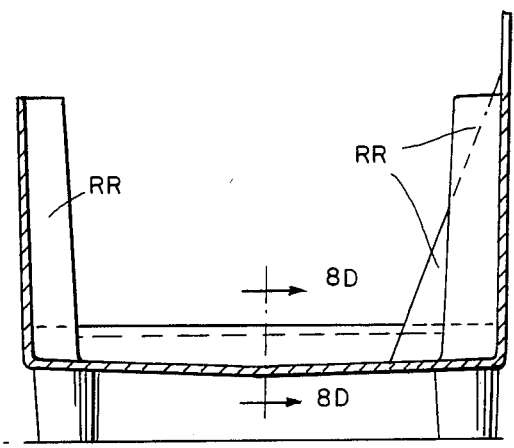
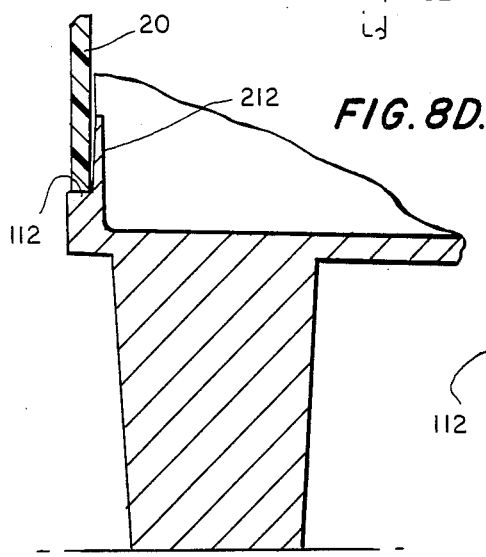
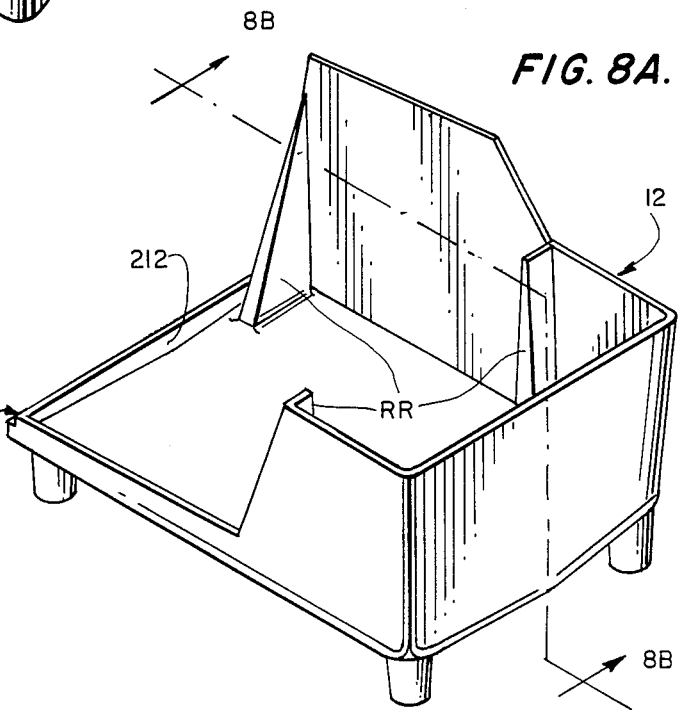
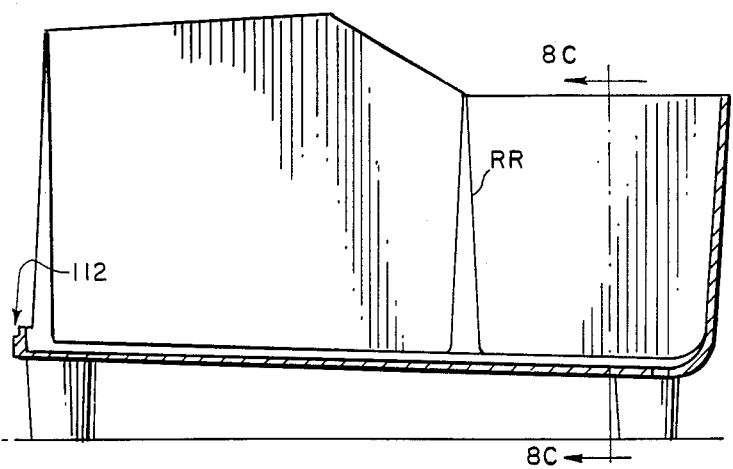

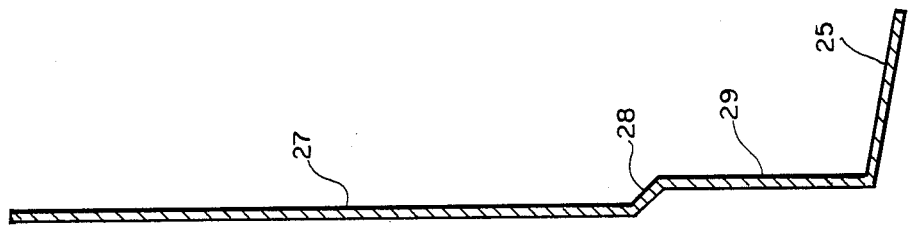
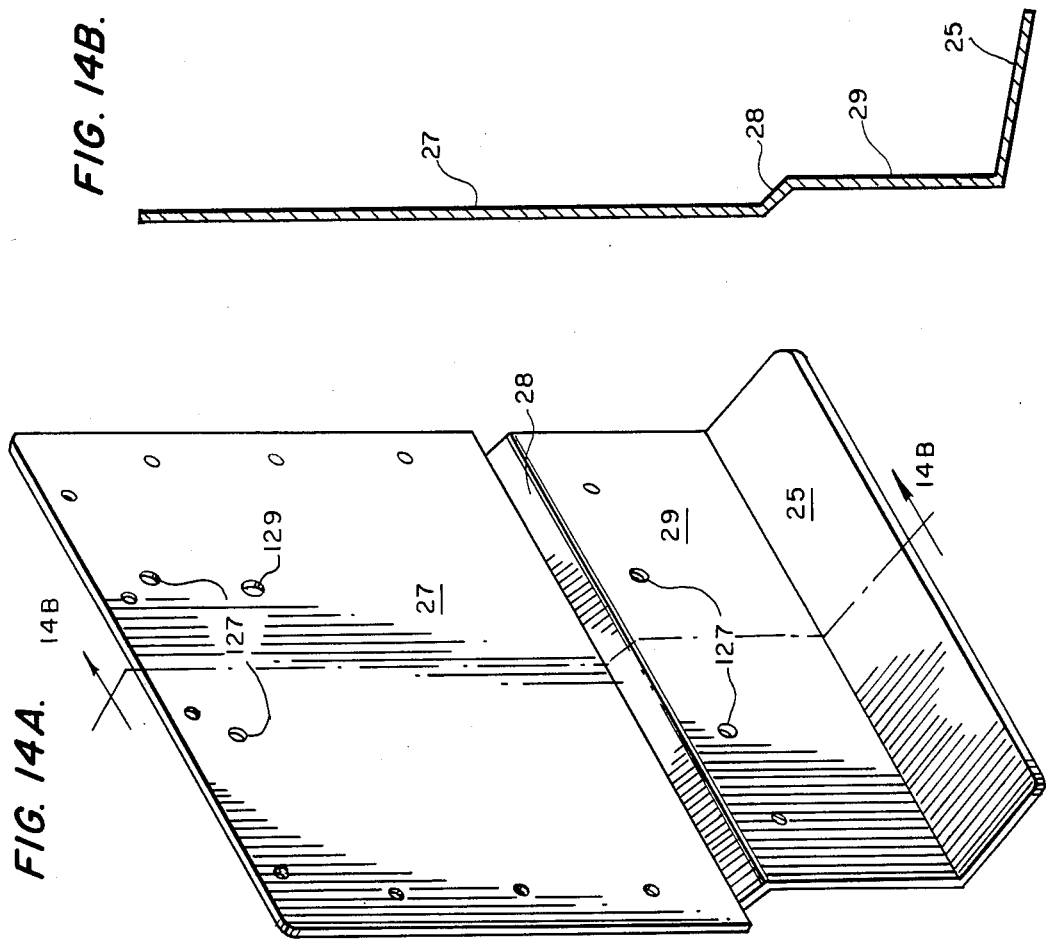
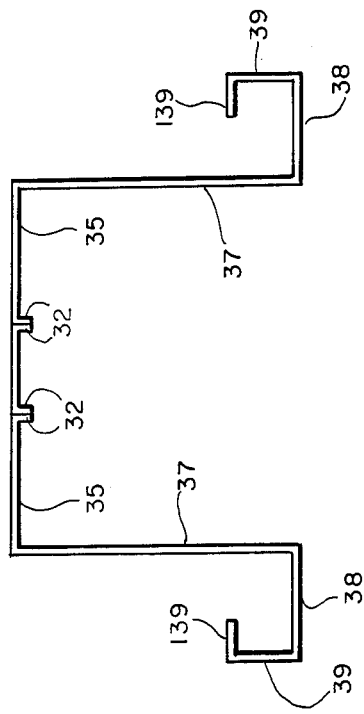
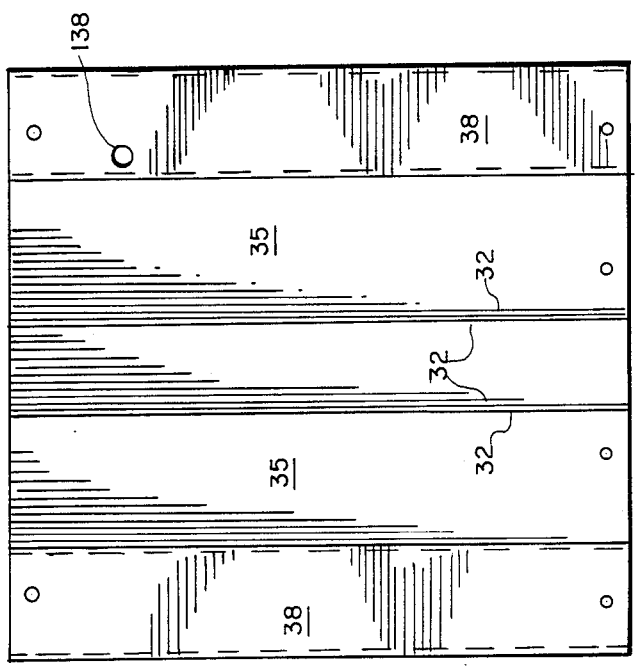

ICE SHAVER

BACKGROUND OF THE INVENTION

1. Field of the Invention

This invention relates generally to devices for shaving ice from solid blocks of ice, and especially for devices for shaving ice for use in snow cones and the like.

2. Description of the Prior Art

A common problem with known devices of the conventional type for shaving ice for snow cones and the like is that they do not provide a user with ice of the desired fineness, nor do they provide a sufficiently positive flow of ice shavings as rapidly and efficiently as possible. Furthermore, known type devices have a tendency for a block of ice mounted therewithin to hang up or catch, and require frequent servicing and maintenance thereof.

Another problem with known type devices is that they do not provide for easy access to the operating structure thereof, nor do they permit quick and easy replacement of shaving blades as oftentimes is necessary. Furthermore, any weighted structure for effecting positive ice block flow oftentimes tends to stick and bind, which thus defeats the entire purpose thereof. Furthermore, guiding and braking structure for the ice block oftentimes is not adequate.

Existing prior U.S. Pat. Nos. which may be pertinent to the present invention are as follows:

2,627,377
2,852,201
2,853,243

While these devices relate to the present invention, none of them disclose or teach the specific structural arrangement of the invention, nor do they offer the new and novel features thereof.

SUMMARY OF THE INVENTION

An object of the present invention is to provide for an ice shaving device for rapidly and efficiently providing a user with as much shaved ice as needed for making snow cones and the like.

Another object of the present invention is to provide a housing structure having an easy access door therewith, castings therewithin for holding knife blades against a weighted ice block, and discharge structure for effecting the desired flow of shaved ice from the device.

A further object of this invention is to provide an ice shaving structure which can be easily mounted in a motorized vehicle, and/or other firm support structure. Multiple speed operation, as well as safety interlock structure, is also provided for. Easy access to the interior for supportive maintenance is also provided.

The present invention comprises an elongated housing mounted upon an adjustable support base in the vertical direction. Very accurate adjustment, therefore, can be achieved. Preferably, a 3° tilt towards the rear is provided so that the removable and replaceable access door on the front of the device will normally close by itself. Mounted from the door is a weighted structure for direct engagement with an ice block as contained within the housing. Guide rails and adjustable braking rails provide for a positive yet controlled vertical flow of the ice block as assisted by the sliding weight on the doorway.

A pair of castings are contained within the housing below the ice block. The upper casting which is rotatable contains at least one replaceable knife blade, though preferably two or more of such blades are provided for. The lower casting which is stationary receives the ice as shaved by the knife blades of the upper casting, and has a discharge opening therewith for feeding the shaved ice into a tapered discharge chute contained in a lower portion of the stationary casting. A replaceable basin below the exit of the discharge chute catches any spilled shavings which are not used by the operator. Preferably, at least one or more pre-molds are provided adjacent the discharge chute for ready use by an operator in forming the desired shape of the snow cones.

A two speed electric motor connected by a belt, pulleys and a drive shaft to the rotating shaving head casting are also contained within the lower portion of the housing. Electrical switches are mounted in the motor circuit for operator safety.

Preferably, a lighted advertising sign is part of the housing construction, and thus will help the user sell the product by advertising his wares.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 4A-4F are views depicting the stationary basin casting per se.

FIG. 5 is a fragmentary portion in cross-section, in side elevation, of the head and basin castings drip ring and supporting assembly.

FIGS. 6A and 6B depict the knife blade and support block assembly.

FIG. 7 shows the ice block slider weight per se.

FIGS. 8A-8D show the features of the bottom frame casting.

FIGS. 13A and 13B show details of the ice house with ice block guide rails at the rear thereof.

FIGS. 14A and 14B show the bearing plate per se.

DESCRIPTION OF THE PREFERRED EMBODIMENT

Figure 1:
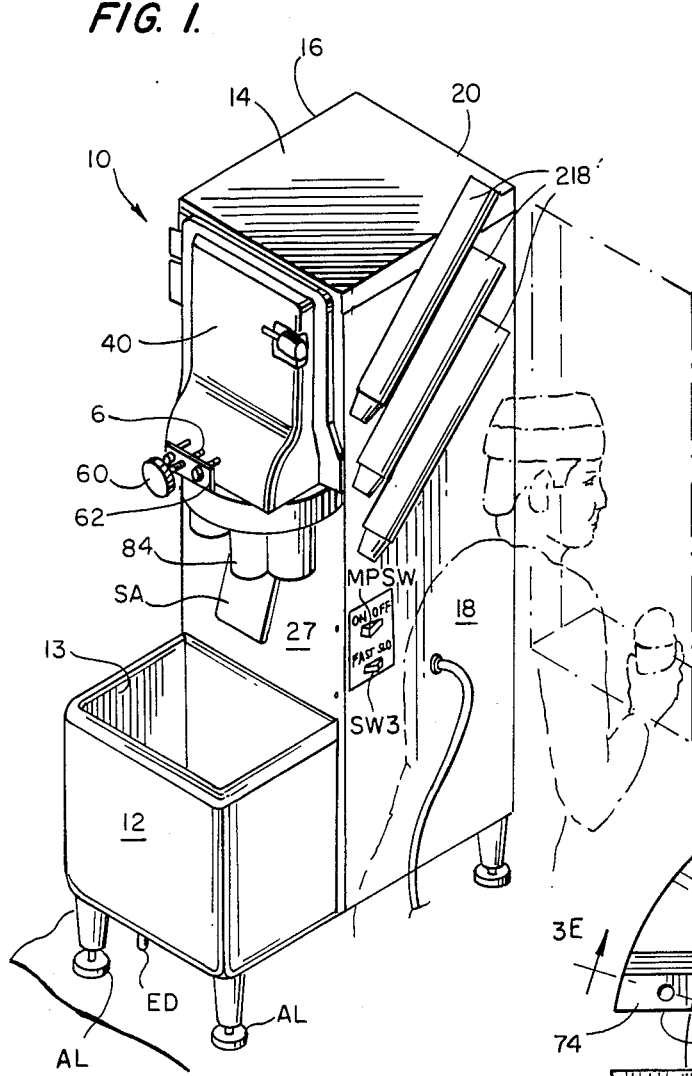
FIG. 1 is a perspective view of the overall device with an operator thereof depicted in dotted lines.
Figure 3A:
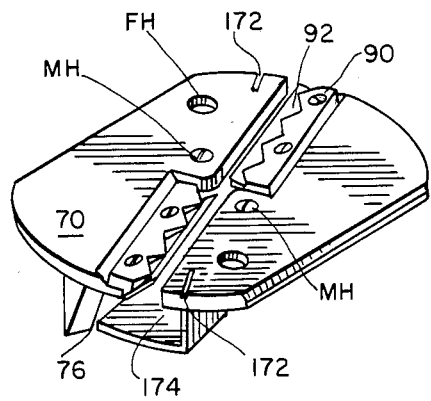
FIGS. 3A-3G are views depicting the rotary head casting per se.
Figure 3B:
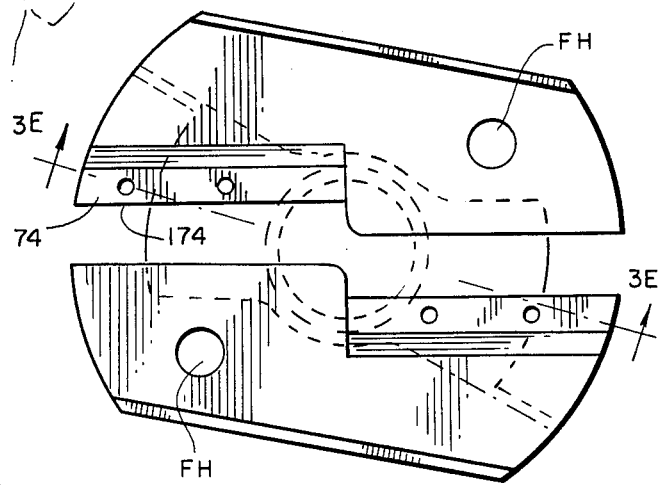
Figure 3C:
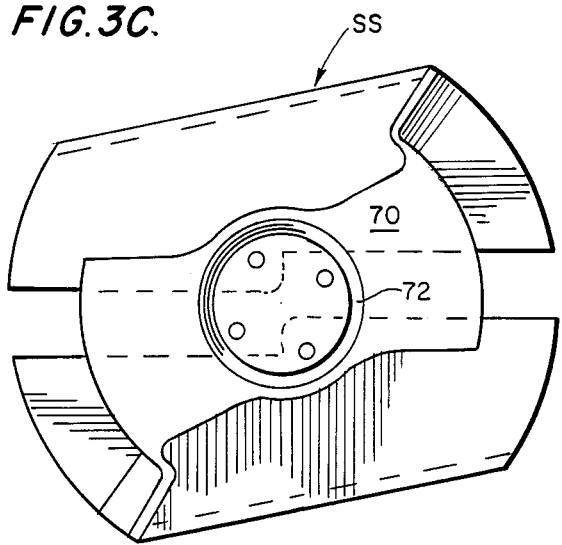
Figure 3D:
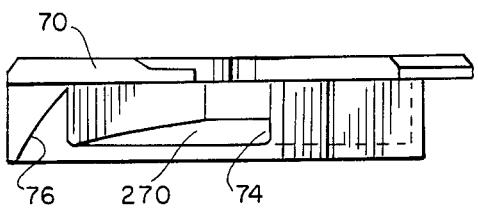

FIG. 1 shows the ice shaver of the present invention in perspective view. This device will permit an operator to quickly and efficiently shave ice as needed and also permits the operator to quickly mold or form the shaved ice into the desired shape in a suitable container ready for reception of the flavor served thereupon.

Figure 2:
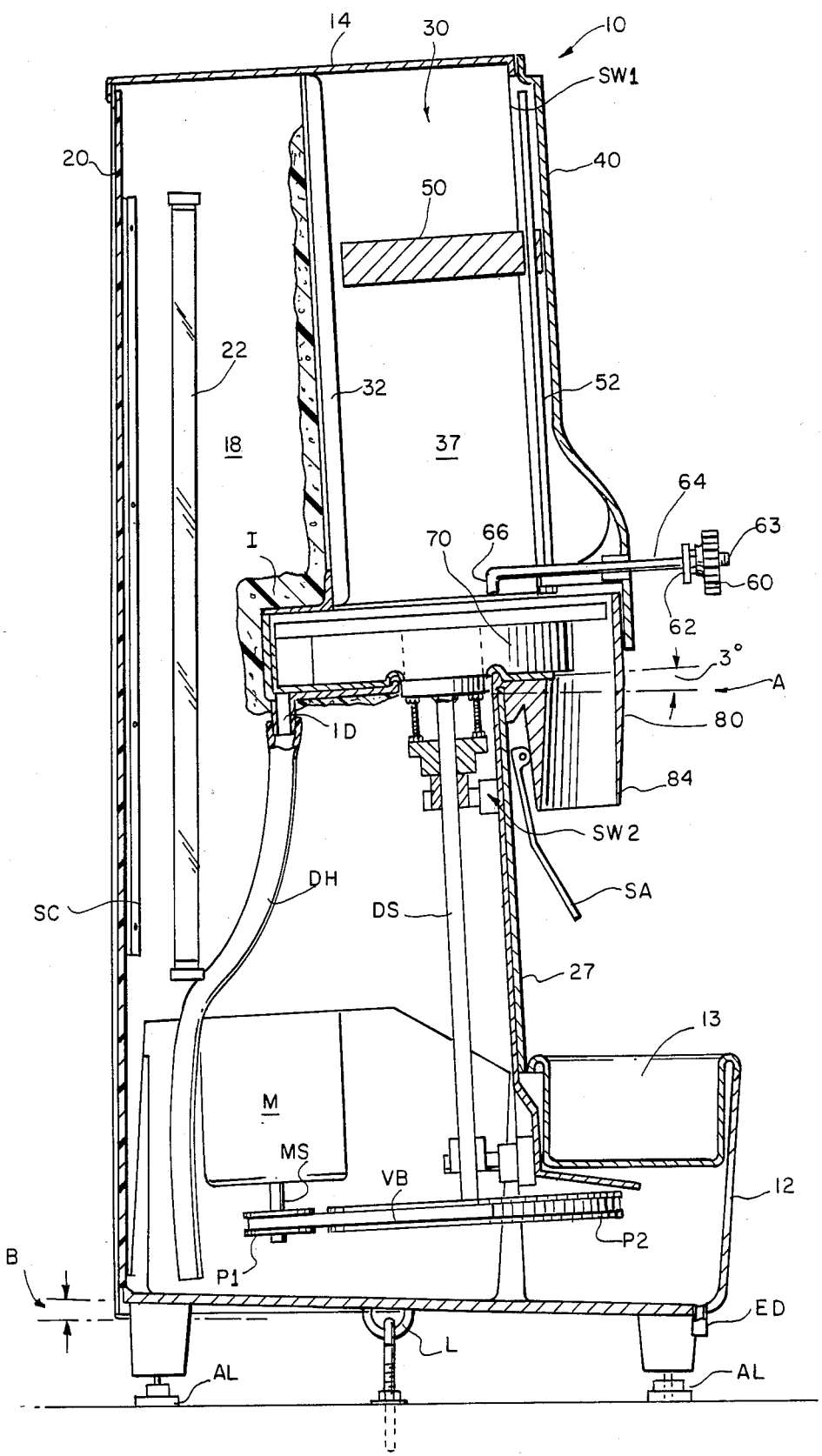
FIG. 2 is a side elevational view from the left of FIG. 1, partly in cross-section, showing the vertical mounting of the present invention.
Figure 3E:
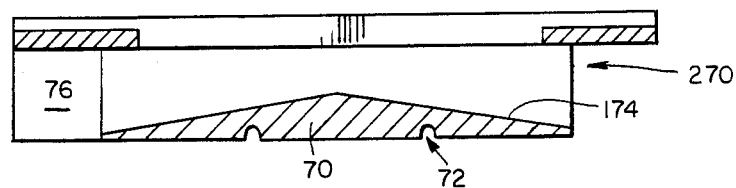
Figure 3F:
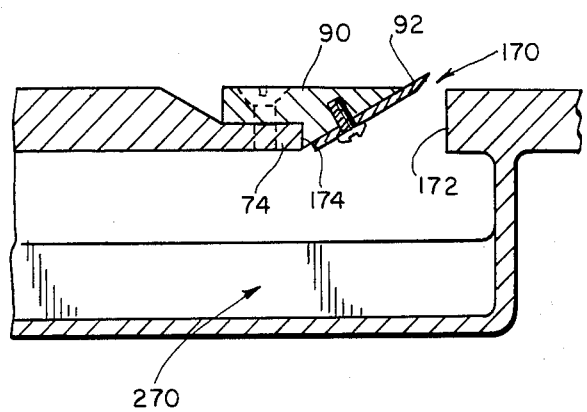
Figure 3G:
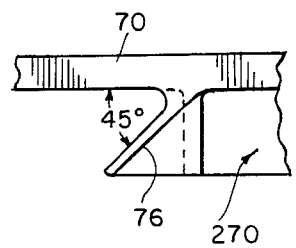
Figure 4A:
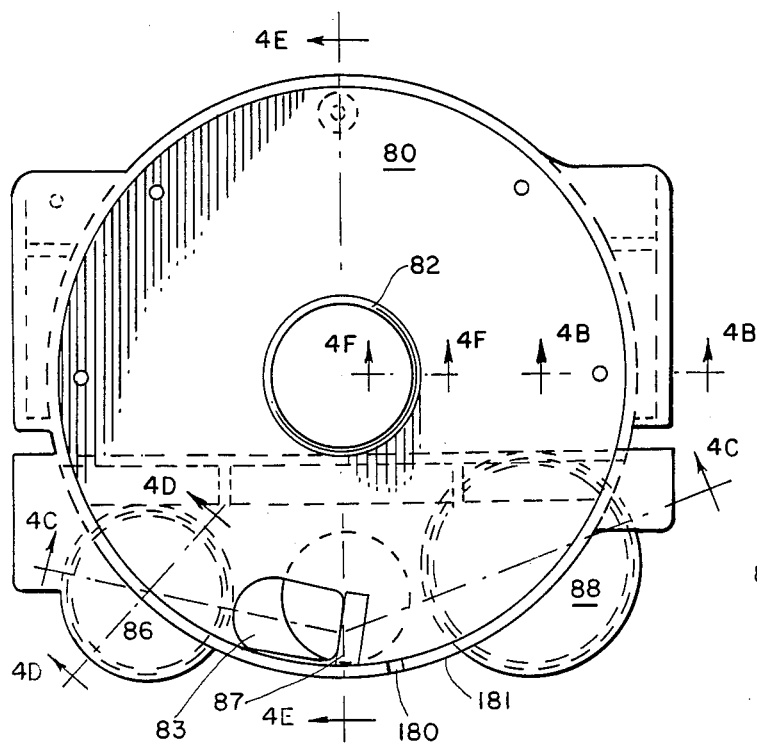
Figure 4B:
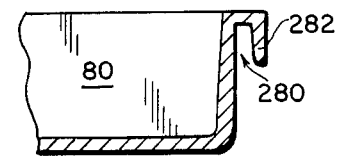
Figure 4D:
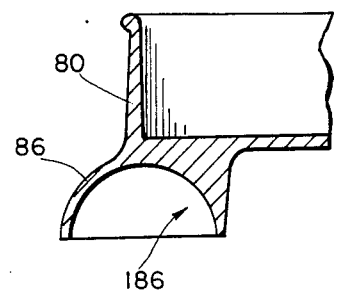
Figure 9A:
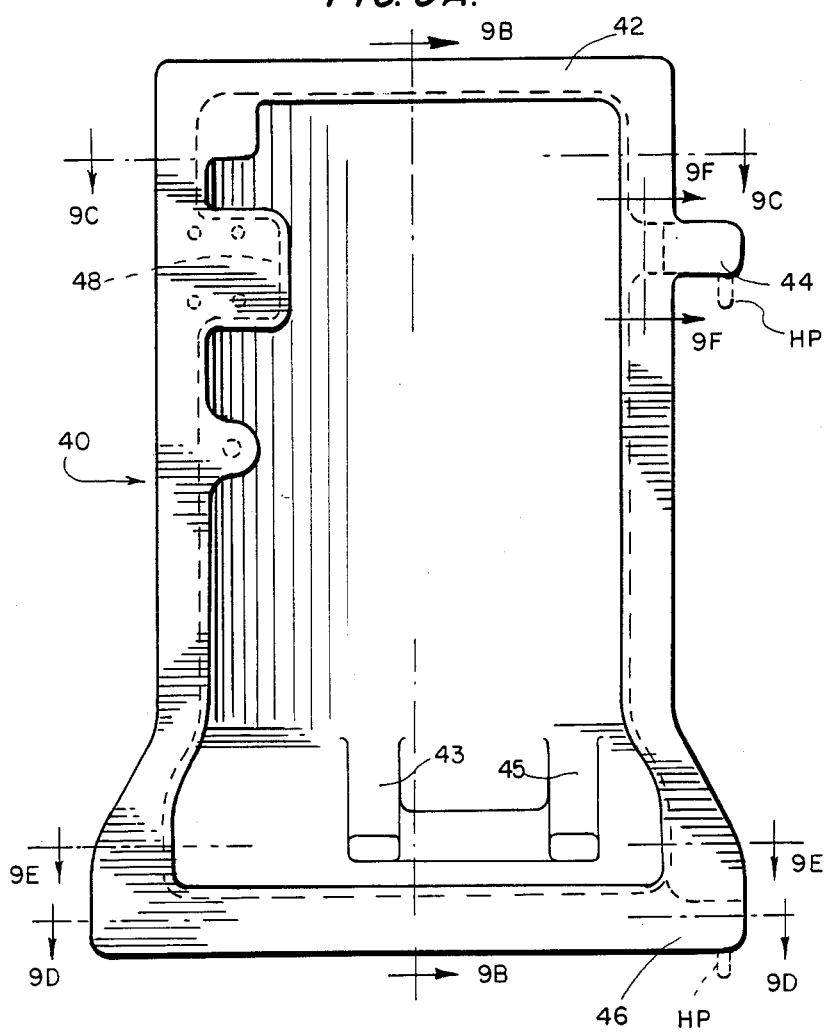
FIGS. 9A-9F show the removable and replaceable door casting per se.
Figure 9B:
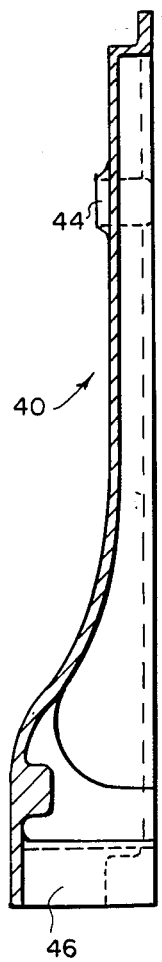
Figure 9C:
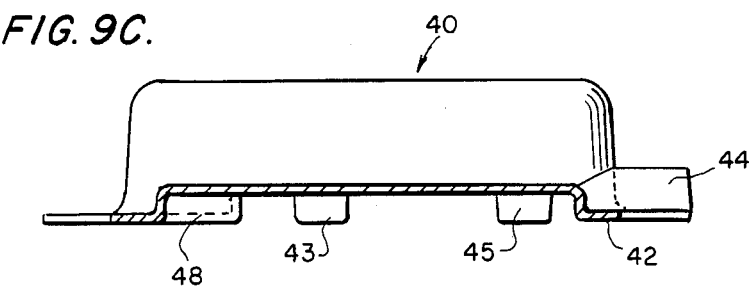
Figure 9F:
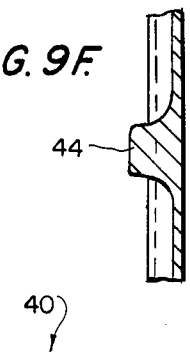
Figure 9E:
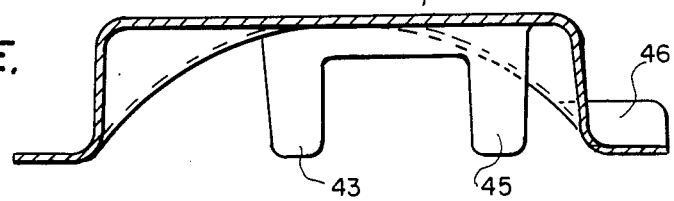
Figure 9D:
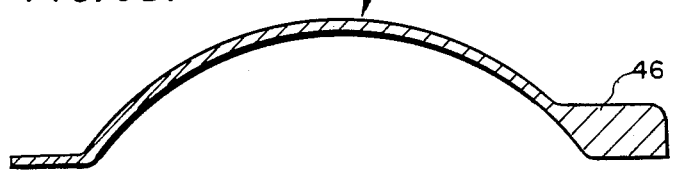

As can best be seen in FIGS. 1 and 2, the device has a vertical layout in order to minimize counter space requirements thereof. As depicted, a base frame 12 supports side panels 16 and 18 with a lid 14 thereupon. The back panel 20 of the device consists of a lighted sign that lifts out for easy access to the mechanical area within the device. A removable and replaceable front door 40 lifts off without the use of any tools, thus allowing easy access to the interior of the device. This permits quick and efficient cleaning and maintenance of the structure. Also, as best seen in FIG. 2, the main housing contains an inner ice housing 30 for reception of an ice block therewithin. This ice housing 30 preferably is insulated on all three sides by insulation I. This, of course, is for the purpose of keeping the ice house colder than the rest of the structure and, thus, slows down the rate of melting of an ice block therewithin. A front bearing plate 27 supports the drive shaft bearings therefrom and also serves as a drip shield to prevent water from dropping on and ruining the V-belt drive. It furthermore functions as a guard to keep an operator's fingers from contacting the drive mechanism. Preferably, lettering will be cast onto the door casting 40 that will explain the operating, cleaning, and loading of the device. For example, TO LOAD—steps A, B, C, D, etc., and TO OPERATE-steps 1, 2, 3, 4, etc. Each control can be labelled with the appropriate letter or number and any necessary direction therefor, etc. Preferably cleaning instructions are inscribed or cast onto the door. To prevent inadvertent grinding or rubbing off of the appropriate instructions, the lettering or numbering may be inscribed or recessed into the metal.

The vertical arrangement of the device, coupled with gravity feed of the ice block contained therewithin makes it possible for the operator to produce the serving of shaved ice and use both hands in holding the container receptacle and molding the ice cone. Other known types of machines or devices for making snow cones require the operator to use a ratchet arrangement in order to feed the ice into the ice shaving blades. This leaves only one hand to hold the receptacle container and form the serving. The arrangement of the present device makes it much easier to efficiently manage and operate an ice cone stand or vehicle.

Before describing the individual components in greater detail, an overview of the entire device will be described. Below the ice housing 30 mounted within the overall device 10 is mounted a pair of castings. A rotatable head casting 70 is contained within a stationary basin casting 80 directly below the ice house structure 30. The ice block will rest upon the rotatable head casting 70 which has appropriate ice blades therewith for shaving ice off the bottom of the ice block. In order to insure controlled and positive feed of the ice block, guide rails 32 are provided at the rear of the ice house 30 and a slider block 50 is mounted for slidable vertical movement upon slider rods 52 provided with the door 40. Adjustable brake rods 64, 66 as controlled by control knob 60 enable the operator to effectively control the dropping of the ice block.

Mounted below the head and basin castings 70, 80 is a drive shaft DS which is supported by pillow bearings from the front bearing plate 27 of the overall housing. A pulley P2 keyed to the lower end of the drive shaft DS is driven from a V-belt VB from a pulley P1 as affixed to the motor shaft MS of the two speed electric motor M. The bottom frame casting 12 receives drainage from the stationary basin casting 70 through a drain hose DH. A drain for external drainage of any overflow liquid is provided (ED) at the front of the device. A removable pan 13 is preferably mounted at the front of the bottom frame casting and beneath the discharge chute 84 of the stationary basin casting. At the four corners of the bottom frame casting are provided adjustable levellers AL and in the approximate center thereof a bolt down lug L is affixed. This bolt down lug permits vertical mounting through use of a J-bolt of the overall device to the countertop or the support surface of a mobile or stationary unit.

Looking at FIGS. 3A-3G and 4A-4E, the rotary head casting 70 and the stationary basin casting 80 will now be described in detail.

The rotary head casting 70 is of cast metal, and is provided with a knife blade block receiving projection 74. Between end 174 of this projection and another edge 172 of the upper portion of this casting is an opening 170 for permitting shaved ice to drop into another channel 270 provided within the casting. Channel 270 preferably has tapered lower surfaces 174 extending downwardly from the midpoint of the channel. At the exit of each panel is provided an angled wiper wing 76. Preferably this wiper wing is at an angle of approximately 45° from the vertical (see FIG. 3G). Also provided within the lower surface of the overall head casting is a drip ring groove 72. This drip ring groove in conjunction with a complementary raised ring 82 provided on the stationary basin casting forms a structure which will permit fabricating of the machine without the use of seals or gaskets. The ring and groove around the drive shaft opening effectively accomplish this. As can be visualized when ice is shaved off the bottom of the ice block by suitable blade structure mounted adjacent the opening 170, the snow will drop into the channel 270 and then because of the centrifugal force thereon due to the spinning of the head casting 70, will flow out the tapered surfaces 174 of the channel to be engaged and forced by the wipers 76 into the appropriate discharge opening in the stationary basin casting.

FIGS. 4A-4E show the stationary basin casting 80 and the important features thereof. This casting 80 has the discharge opening 83 cast thereinto and a discharge chute 84 having a discharge opening 85. The inside of chute 84 has a tapered surface 184 for effecting ice shaving discharge. Also cast into the stationary basin casting are snow cone molds 86 and 88. Each of these has a contoured inner cylindrical or semi-cone shaped surface 186 and 188, respectively, for forming appropriate small or large snow cones. A raised drip ring 82 for complementary reception within the groove 72 of the rotating head casting is also cast into the basin casting 80. Also an alignment notch 180 is appropriately formed adjacent the outer rim 181 of the basin casting. It should be noted that a similar notch 172 is also provided on diametrically opposite sides of the head casting 70. Appropriate finger holes FH are also provided on diametrically opposite sides of the upper surface of the rotary head casting. The purpose of the notches 172 is so that one head casting notch can be aligned with the notch 180 of the basin casting. By using the finger holes FH within the head casting, the operator can safely rotate manually the head casting without danger of cutting himself on the knife blades, and thus align the respective notches. It should be noted that the head casting is semisquare SS in overall shape. The purpose of this is so that when the respective notches are aligned, an operator can easily remove the two bolts securing the head casting to the drive shaft and then lift the head casting up through the ice housing for cleaning in another adjacent sink or appropriate basin. Also, once the head casting has been removed, access to the basin casting is facilitated, which overall will facilitate both cleanup of the machine and the making of any necessary repairs or maintenance adjustments.

It should also be noted that the discharge wall 184 of the discharge chute 84 of the basin casting is tapered outwardly to prevent hang ups of the snow ice, and also sized to minimize the possibility of an operator's hand from entering the mechanism.

It can also be seen that knife blade replacement can be made quickly and easily by an operator, simply by removing two screws on each blade block and dropping in another set of preset blocks. Replacement can thus be made in a minute or so without tearing down the machine. Also, this can be done through the front door 40 after removal of same from the overall housing.

Preferably, both the head casting 70 and the basin casting 80 are lined with an epoxy finish to fill any voids or pits in the castings themselves. This epoxy coating also will prevent snow from clinging to the respective casting. Furthermore, the machine is preferably tilted back at 3° from the vertical, as indicated by the rear tilt arrow A in the center of FIG. 2. This 3° tilt will accomplish two things. First any moisture or liquid in the basin casting will run to the rear thereof and drain out the internal drain ID thereof into the drain hose DH for reception within the bottom frame casting 12. This large casting acts as a large catch tub and, furthermore, slopes towards the front, as indicated by tilt arrow B so that the operator of the device can simply lift the catch pan 13 to inspect the drain's condition. Another function of the rear tilt A is to help the door 40 close, and a third function is so that the operator can see and operate the machine somewhat easier.

The stationary basin casting is also provided with a shear strip 87 located adjacent the discharge chute on the afterside thereof. This, in conjunction with the angled wiper wing 46 of the rotating head casting, forces the snow into the chute opening 83 and prevents the wing from carrying the shavings further around the inside of the basin casting.

FIG. 5 shows, in fragmentary cross-section and side elevation, how the head and basin castings relate to each other after assembly. The raised ring 82 of the stationary basin casting 80 can be seen as it normally fits into the groove 72 of the rotatable head casting 70. The ice snow channel 270 also can be seen with the shaved ice receiving channel 170 in operating relationship with respect to the blade block 90 and the knife blade 92. As shown, a pair of recessed head screws RHS bolt each blade block 90 to the projection 74 of the head casting. Flat head screws FHS, normally four in number, hold the knife blade 92 in proper position to the blade block. As further shown in FIG. 5, the head casting 70 is affixed to the shaft flange SF which is welded W to the drive shaft DS. In order to take the weight of the ice block upon the rotatable head casting without detriment to the drive structure, adjustable jack screws JS are mounted within a collar C which is supported by the inner bearing race IBR of the upper bearing pillow block. Thus initially appropriate adjustment of the jack screws can be made and then locked by lock nuts LN. Thereafter, appropriate further adjustment and maintenance can be made easily.

FIGS. 6A and 6B show the blade block and knife blade structure per se. The blade block is an elongated member having an inclined surface 94 for reception of the knife blade 92 thereagainst. Preferably, saw teeth 95 are provided on the outer edge of the tapered side of the block. The saw teeth 95 are chamfered or tapered so that shaved ice will not catch or be held thereby. Preferably, four threaded holes 192 are provided for reception of the knife blade attaching flat head screws FHS. A recessed portion 96 on the other edge of the block complement with the projection 74 of the head casting and two holes 190 provide for the two screw attachment of the knife block to the head casting.

FIG. 7 shows the ice block slider weight 50 and the projections 51 provided therewith for mounting same from the door 40. Appropriate apertures 152 are provided through these projections to receive the door slider rods 52. By using this slider weight, it is assured that sufficient weight is placed on the ice to force same into the knife blades of the rotating head casting. This will be effected even when only a small part of a block of ice remains. However, preferably the weight 50 has a radiused edge 54 that assures that the weight will slide off of the ice block after it has "melted in" to the block following a period of time. This is necessary as the weight is attached to the door 40 and thus swings clear of the device as the door is opened. A slight taper in the vertical direction of 4° or so is also preferable for edge 54.

FIGS. 8A–8D show the bottom frame casting 12 in enlarged detail. A rear ledge 112 with raised flange 212 provides a support for the rear enclosure sign 20. Suitable reinforcing ribs RR strengthen the side walls of casting 12. This casting supports an angle iron mounting frame for the housing side panels as well as the motor M support structure (see FIG. 2). Sign clamps SC, as appropriate, hold sign 20 to the right and left housing side panels 16, 18.

FIGS. 9A–9D show the removable and replaceable door casting 40. Along one side of the casting are door hinge blocks 44 and 46 for suitable reception of appropriate hinge pins HP therewith. It should be noted that the respective hinge pins are of different lengths so that during replacement of the door an operator need only align and insert one hinge pin before the necessary alignment of the second hinge pin is required. This is another feature which assists and aids the operator in servicing and maintaining the structure. On the other edge of the door casting are provided a block and recess 48 for reception of appropriate closure structure for allowing the door to be secured after mounting upon the overall housing. A gasket face surface 42 is also provided. The surface is extremely smooth for effecting a tight seal with the housing without the use of any other type of gasket structure. Near the center bottom of the housing are control structure blocks 43 and 45. These blocks permit the ice block flow control to be mounted upon the door. This structure comprises a control knob 60 and a panel plate 62 mounted between the ends of adjustment brake rods 64. A threaded rod 63 affixed to the front of the door receives the control knob 60 thereover by a threaded aperture within the control knob which permits fine and accurate adjustment thereof along the threaded rod. By adjusting the control knob, the brake rods 64 can be moved inwardly against the ice block so downwardly bent ends 66 will engage the outer face of the ice block with the door 40 closed. The flow of the ice block through the blades is controlled by the use of this control knob that pushes the inverted end runners 66 against the ice block to act as a brake. The operator feeds the flow of ice into the blades by simply adjusting or reducing the pressure on the runners. Runners preferably are used rather than a single piece of sheet metal since the runners can apply more pressure with lesser force overall, and will also not tend to catch on a high place in the ice blocks as readily.

The ice block is held in the ice house 30 by the use of a set of attached runners located on the back of the ice house. These runners 32, as best seen in FIG. 13, are made so that either a very small block will be held, or one of full width. Whatever size ice block is used, the block melts onto the thin metal of the runners quite quickly and thereafter the runner acts much like a set of rails on a train to guide the ice into the knife blades without sidewise motion. Motion in the in and out direction is controlled by use of the control knob runners 66 as already discussed. This same pressure from the control knob also acts as a brake and to hold the ice block against the back of the ice house.

Figure 10A:
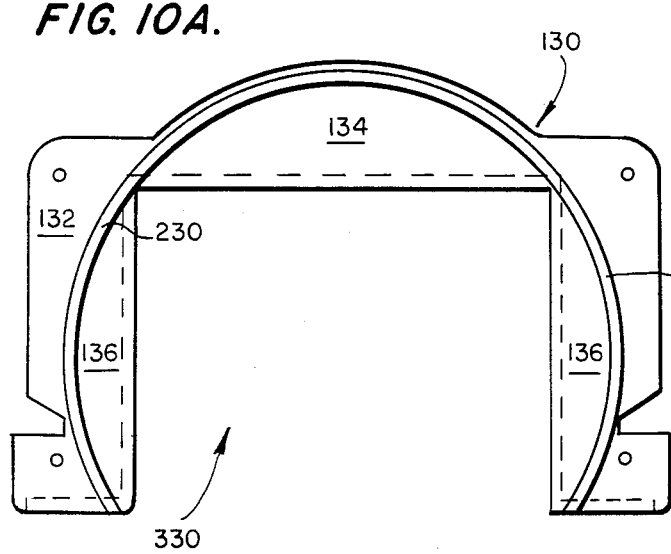
FIGS. 10A-10C show the frame or lid for the basin casting.
Figure 10C:
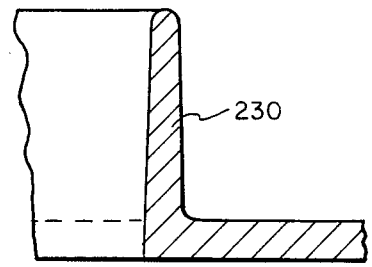
Figure 10B:
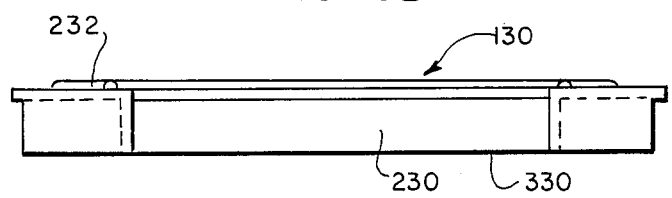

FIGS. 10A–10C show the basin lid 130 which is mounted in the mid-portion of the housing and which closely engages the stationary basin casting. Flange rim 230 mates with and complements the basin casting. This lid 130 also supports the ice housing structure 30 thereupon which accounts for the rectangular recess 330 therein. The flat flanges 132, 134 and 136 separate the overall housing into upper and lower portions once the lid 130 is mounted in the housing by conventional fasteners.

Figure 11A:
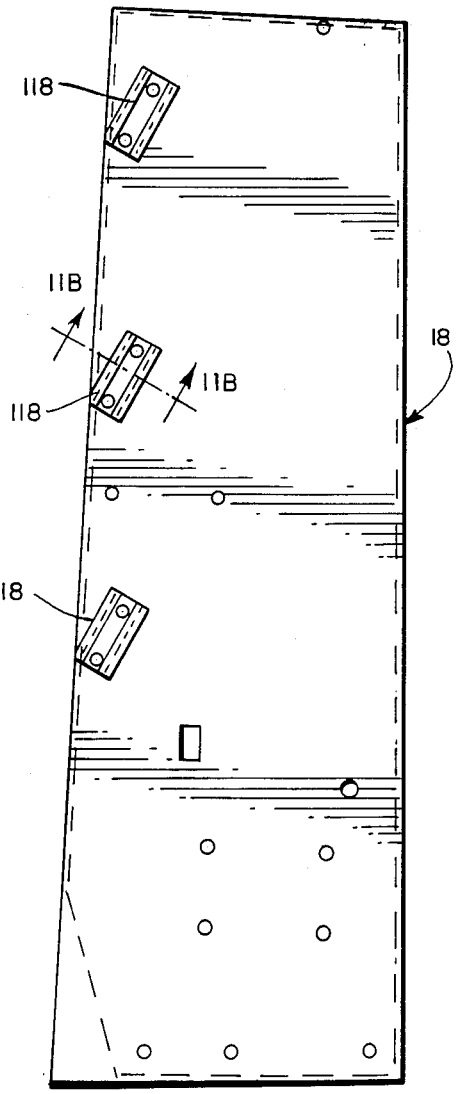
FIGS. 11A and 11B show the right side housing panel with cup dispenser clips attached thereto.
Figure 11B:
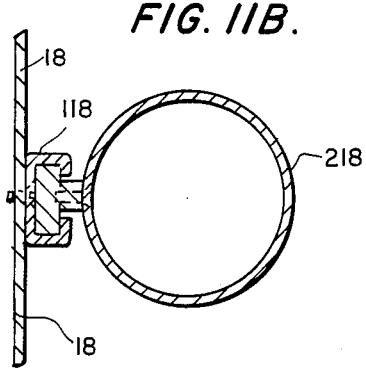

FIGS. 11A and 11B show the right side housing panel 18 which has cup dispenser brackets 118 affixed thereto. Each bracket 118 will support thereon a cup dispenser 218. The left side housing panel 16 is similar to 18, but does not have the brackets thereon.

Figure 12A:
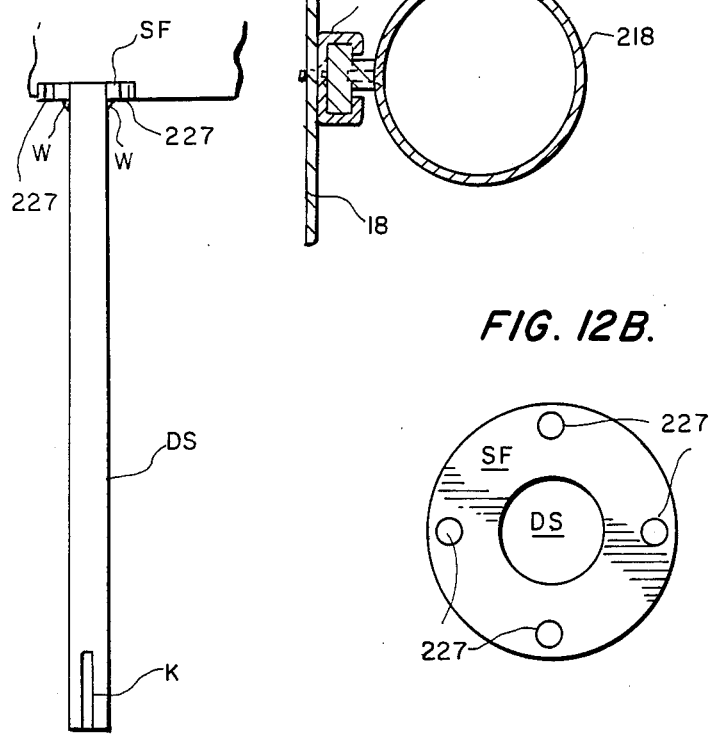
FIGS. 12A and 12B show the drive shaft and shaft flange details.
Figure 12B:
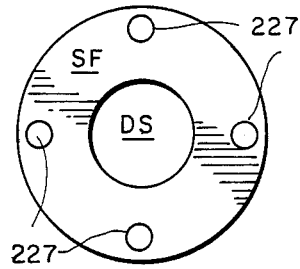

FIG. 12 shows the drive shaft DS and the flange SF details, while FIGS. 13A and 13B show the ice house 30. The guide rail structure 32 at the rear thereof can be readily seen. Back panels 35, together with side panels 37 and formed front panels 38, are shown. Outer edge panels 39, as well as the short back reinforcing strips 139, are depicted. Hole 138 is for the snap switch SW2.

FIGS. 14A and 14B show the bearing plate and drip shield structure and the desired configuration thereof in cross-section. Holes 127 are for the bolts to affix the pillow block bearings. Hole 129 is for the normally open, push snap switch SW1, which is closed when the operator pushes on switch arm SA. The lower end of the bearing plate has offset portions 28, 29 and 25 to function as a liquid/ice shaving drip shield.

Figure 15:
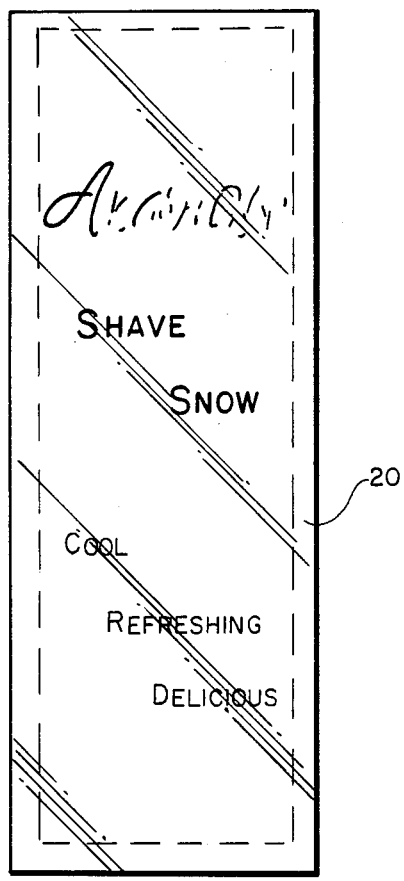
FIG. 15 shows the plexiglass sign per se

FIG. 15 shows the plexiglass sign for mounting upon the rear ledge of the base frame casting. The sign prefereably has advertising material printed or inscribed therewith for increasing the sales of an operator's wares. Preferably, the sign is translucent so that the fluorescent light 22 will shine therethrough.

Figure 16:
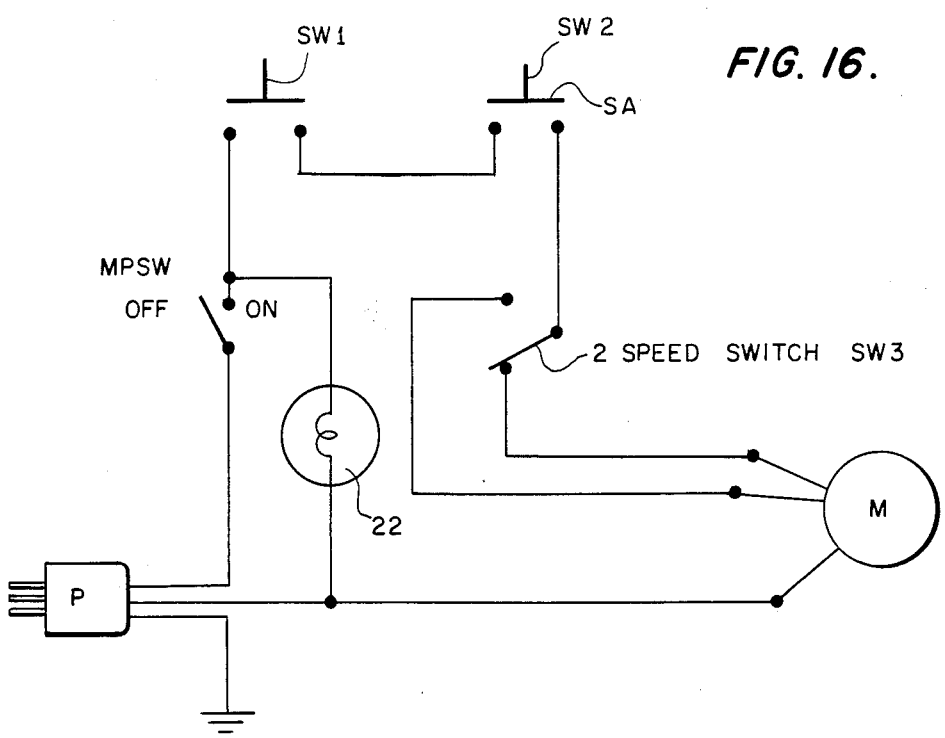
FIG. 16 is a schematic of the electrical wiring of the present invention.

FIG. 16 is an electrical schematic of the wiring of the present invention. The normally open snap switches SW1 and SW2 as mounted upon the housing structure are in series with the main power switch. A grounded plug P is provided for safety reasons. A single pole, single throw toggle switch SW3 provides for the two speed energization of the motor M. Also the fluorescent light 22 is suitably energized upon closing of the main power switch MPSW.

It should be noted the important safety features of the electrical wiring arrangement. That is one of the safety switches SW1 is mounted in the upper right corner of the housing to be closed when the door 40 is secured. The other safety switch SW2 is mounted for actuation by the switch arm SA. The switch arm SA is normally moved and the SW2 closed when an operator pushes the receptacle cup into place beneath the discharge chute 84. Thus, in operation, the machine is actuated by depressing the switch arm SA as the cup is held under the discharge chute. Releasing the switch arm stops the machine. Other machines have a separate switch that can be operated both before and after the serving. However, this is not desired in the present invention.

It should be noted that three cup dispensing brackets are located on the right hand side of the machine. These are located at such an angle that the cup dispensers do not extend above or behind the machine when they are in place. By having three different cup size dispensers provided, the operator is given the option of selling all three sizes of snow cones.

It should be noted that the machine's working parts can be removed without any teardown of the housing cabinet merely by removing the head casting from above and the bearings from behind the bearing plate. Pillow block bearings, a standard cafeteria type pan, a V-belt and suitable pulleys are used, all of which can be bought locally in the event of a device breakdown. During such maintenance and/or cleaning the rotary head basin is positioned for removal by aligning the respective notch located on the outer diameter with the corresponding notch located on the lip of the stationary basin. Upon suitable alignment, the two screws holding the rotating head to the drive shaft flange can then be removed and the head lifted upwardly through the ice housing and removed from the entire device.

Likewise, the knife blades are very easily removed for resetting or replacement. Simply opening the door and backing out the two screws for each block removes that block with blade and another blade and block can simply be dropped into place in the matter of seconds. Repeating this for the other blade block allows the stand to be back in business in a matter of a minute or two. Other known type machines require teardown for blade removal and replacement.

The easily removable door and head casting are important for cleaning purposes. By removal of both the door and the head casting, all that is left to clean is an empty basin casting which the operator can quickly wipe out, along with the empty ice house lining. The head and door castings can then be cleaned in any other appropriate receptacle.

Of course, the two speed motor and appropriate toggle switch for control thereof permit the operator to function rather slowly, if a beginner, or quite rapidly, if an experienced operator.

In summary, an overall description of the device and use thereof will now be provided.

The present device is a shaver that produces a very finely shaved snow product directly into a serving container as the need arises. The machine uses square or rectangular shaped blocks of ice that are loaded by opening the door 40, and placing the block of ice directly into the upper ice house 30. To close the door, the operator need only raise the slider 50 and manually hold it up while closing the door. Allowing the slider to drop onto the top of the ice block just before the door is fully closed. The ice block is prevented from sliding from side to side in the ice house during operation by the set of tracks 32 down the back side of the ice house. The tracks are simply the edge of a piece of sheet metal that direct the ice to the blades. The ice block melts onto these tracks immediately upon loading by the simple weight of the block. The ice block is directed downward by its own weight (up to 15 lbs.) and by the added weight of the slider (about 5 lbs.). The slider assures that enough weight is on the ice, even when only a small portion of the block is left, to hold the ice block to the blades and prevent bouncing as the blades rotate. The slider is guided by rods 52 mounted on the door casting. These rods also prevent the slider from touching, and thus dulling, the blades as the last of the ice block is used.

Finally, the ice block is held to the back of the ice house by use of the adjustment clamp and knob 60 located on the door. As this clamp mechanism swings away with the door upon opening, the ice house is clear of any obstacles while loading. To adjust the clamp, the operator simply tightens the control knob 60 after closing the door. This action slides the bent rods back to the ice block and applies pressure to the block. This pressure both holds the block in a stationary position, and slows the flow of the block through the blades. This action regulates the speed of shaving, and also the grade of the shaved snow. To get a faster or slower discharge rate, the operator simply loosens or tightens the control knob. The rods 66 are bent in order to prevent the rods from melting into and thus holding up the ice block.

Operation of the machine is done by holding the chosen container under the discharge chute 84 of the basin casting 80 and depressing the switch arm SA. This action starts the motor that drives the shaver head through the belt and pulley arrangement. Releasing the switch arm stops the motor and thus the snow discharge.

The operator can shape the serving by use of either of the two molder shapes 86, 88 cast onto the basin casting. These molders are simply hollow shapes with an open bottom that form the shaved snow with only a twisting motion of the operator's wrist. Two sizes of molder are available for a choice of serving sizes. These molders also assure portion control from serving to serving.

The operator can choose the operating speed of the machine by selecting the speed indicated on the switch located on the cabinet. One position of the switch is marked FAST and the other SLOW. Changing from one position to the other on this switch will alter the motor speed and thus the output speed of the present device. This speed change is important to the beginning operator that might need a slow speed while getting acquainted with the equipment, or the operator that wishes a faster output.

A main power switch located on the side of the cabinet energizes the circuitry and the fluorescent light for the display sign located on the back of the unit. A normally open snap switch SW1 is located on the upper corner of the door, and another behind the switch arm SW2. The door must be closed, and the switch arm depressed (along with the main switch turned to ON) before the motor can operate. The switches are located far enough apart to prevent the operator from operating both with a single hand. Thus, the operator is prevented from reaching into the machine while the unit is running.

The unit shaves snow by the following method. A revolving head casting has the bottom of the ice block resting thereon. This head casting 70 holds the two blades, and attaches to the shaft DS that is turned by the motor M. As the motor is actuated, the head casting revolves (with the blades), and shaves off the desired amount of snow. The blades are easily removable by lifting out two screws and removing a blade block casting that holds each blade. Altering the blade setting will change the output grade and rate of the snow. Little or no down time of the machine is required for a blade change. The operator simply replaces the existing blocks with preset blocks containing new blades.

The head and shaft assembly is supported by use of two pillow block bearings firmly attached to the machine castings. These bearing are readily replaceable (along with the V-belt and pulleys) so that the operator will not face long downtime should they fail in the field. The ice blocks weigh up to 15 lbs. each, so support is needed to prevent the blocks from driving downward the head as they are dropped onto the head. A jack screw arrangement (see detail) that sits atop the upper bearing's inner race turns along with the head, shaft, and inner bearing race to form a unit. The screws (2) give the adjustment necessary to correct for wear and manufacturing deviation.

As the ice is shaved, the snow falls into a channel cast into the head casting 70. This channel is tapered both outwardly and downwardly to prevent snow from collecting and clogging up the channels. The rotational movement of the head casting also tends to throw the shaved snow outward. The casting is finished smoothly in order to further minimize clogging. After the snow is moved to the outside edge of the head, a wiper (also cast onto the head) moves the snow downward and finally out of the discharge chute. The discharge chute is also tapered to prevent clogging, and sized to minimize the possibility of reaching up and into the moving mechanism.

The removable blade blocks have notches cast into them, and a rounded upper edge. These notches contain any ice accumulating behind the blade, and the rounded notch is necessary to prevent any ice from being scraped from the bottom of the ice block. These are necessary to keep the ice from building up behind the blades, and then preventing the block from contacting the blades. The blade blocks have lines cast onto them to help in setting the blade height.

Water in the basin from condensation, or melting ice, will drain around the drip ring cast onto the inside of the basin casting 80 and to the back of the casting. This is due to the 3° backward slant of the machine. At this rearmost point, a drain is located to carry away any liquids. This moisture is drained onto the frame casting (which is shaped to form a trough toward the operator's end of the machine) and then out the external drain. Any moisture coming out the discharge chute and not captured by the removable pan will also drain from this front drain. The external drain is located under the pan so that the operator can simply lift the pan to inspect the condition of the drain. The bearing plate 27 is bent so as to provide a belt cover for moisture protection of the belt and a belt guard to keep the operator's hand clear of the belt. Additionally, the backward slant of the machine further facilitates the operator's visibility and ability to reach the controls, etc.

The bottom of the machine is equipped with a cast-on lug so that the operator can bolt the machine to the countertop by use of a J-bolt and easily keep the machine from tipping over. Mobile stand operators will find this especially helpful. Operating instructions, cleaning instructions, and loading instructions preferably will be cast onto the outside of the door casting 40 and levelling legs are provided at each corner to help the operator properly set up his machine.

Cleaning of the machine is accomplished by lifting the door off its hinges, and removing two screws located at the center of the head casting. The entire casting can then be lifted out leaving an empty ice house and basin casting. These can be washed, rinsed and sanitized manually, and the door and head castings be placed in the three basin sink and cleaned. Two alignment pins assure that the head is properly aligned upon reassembly. Reassembly of the door is aided since the two hinge pins are of different lengths. In this manner, the operator need only align one pin at a time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. Apparatus for shaving ice for making snow cones comprising:
   an elongated housing;
   base means for supporting said housing upon a suitable platform;
   casing measn for shaving ice particles from a block of ice and dispensing such shavings therefrom;
   access means provided with said housing for facilitating service of structure interiorly thereof;
   weight means with said access means for providing gravity bias to a block of ice after thereof within said housing;
   guiding and braking means for controlling the flow of said block of ice within said housing;
   discharge means for receiving and dispensing the shaved ice;
   said casing means including a pair of castings, one casting being stationarily mounted beneath the other one which is rotatably mounted, thus the lower casting catching ice shavings as produced by the upper rotatable casting from the block of ice; and
   said upper rotatably mounted casting having a central channel for receiving the ice shavings with an entrance opening to said channel having ice shaving means affixed adjacent said opening.

2. The apparatus for shaving ice of claim 1, wherein said elongated housing is preferably mounted with the central axis thereof in the vertical direction, and is provided with mold means adjacent said discharge means for permitting an operator easy shaping of the discharged ice shavings.

3. The apparatus for shaving ice of claim 2, wherein saisd base means for supporting said housing includes means for levelling said housing as oriented in the vertical direction.

4. The apparatus for shaving ice of claim 3, wherein said levelling means comprises at least one adjustable leg at at least one corner of said base means, and wherein said base means is further provided with attaching structure for permanently affixing said base to said platform.

5. The apparatus for shaving ice of claim 2, wherein said mold means comprises at least one specially configured mold in the shape of an inverted rounded cup for ease of operator molding of the shaved ice.

6. The apparatus for shaving ice of claim 1, wherein the upper casing as part of said ice shaving means is provided with at least one replaceable knife blade for effecting the shaving of a block of ice resting thereupon.

7. The apparatus for shaving ice of claim 6, wherein said knife balde is mounted on a removable blade block which is affixed to said upper casing adjacent said entrance opening therein.

8. The apparatus for shaving ice of claim 7, wherein said entrance openings has parallel entrance edges.

9. The apparatus for shaving ice of claim 8, wherein said ice shaving channel has a wiper wing at an end thereof.

10. The apparatus for shaving ice of claim 1, wherein said access means includes a door pivotally mounted on said housing for easy access to the interior of said housing.

11. The apparatus for shaving ice of claim 10, wherein said door is mounted by means so it can be quickly and easily removable in its entirety, and said housing is oriented with a 3° tilt toward the rear so that said door will be self-closing as normally mounted upon said housing.

12. The apparatus for shaving ice of claim 1, wherein said weight means comprises an additional weight which normally rests upon said block of ice to assist the biasing of same by gravity against said casing means.

13. The apparatus for shaving ice of claim 1, wherein said guiding and braking means includes a plurality of rails mounted within said housing for guiding the flow of the ice block in the vertical direction within said elongated housing.

14. The apparatus for shaving ice of claim 11, wherein said brake means further includes an adjustable control for moving at least one of said rails inwardly and outwardly to brake said vertically moving ice block.

15. The apparatus for shaving ice of claim 1, wherein said discharge means comprises a tapered outlet from said casing means for permitting egress of the shaved ice from the device.

16. The apparatus for shaving ice of claim 1, wherein a two speed motor is used for operating said casing means for shaving the ice from said ice block either fast or slowly.

17. The apparatus for shaving ice of claim 16, wherein an operator safety interlock switch is provided with said device for de-energizing said motor upon opening the door to said housing.

18. The apparatus for shaving ice of claim 1, together with advertising material inscribed upon said housing.

19. The apparatus for shaving ice of claim 1, wherein said internal structure of the housing includes a drive motor, a rotating shaft suitably supported from pillow bearings, pulleys and a V-belt for effecting rotation of said casing means upon energization of the drive motor.

20. Apparatus for shaving ice for making snow cones comprising:
    an elongated housing;
    base means for supporting said housing upon a suitable platform;

casing means for shaving ice particles from a block of ice and dispensing such shavings therefrom;

access means provided with said housing for facilitating service of structure interiorly thereof;

weight means with said access means for providing gravity bias to a block of ice after placement thereof within said housing;

guiding and braking means for controlling the flow of said block of ice within said housing;

discharge means for receiving and dispensing the shaved ice;

said access means including a door pivotally mounted on said housing for easy access to the interior of said housing;

said door being mounted by means so it can be quickly and easily removable in its entirety, and said housing being oriented with a 3° tilt toward the rear so that said door will be self-closing as normally mounted upon said housing; and said door supporting and guiding said weight means for biasing said ice block, thus said weight means being disengaged from said ice block upon opening said door.

21. The apparatus for shaving ice of claim 20, wherein said weight means is provided with a chamfered external edge so that the weight means will not prevent opening said door after said weight means has sunk into said ice block after the melting thereof.

22. Apparatus for shaving ice for making snow cones comprising:

an elongated housing;

base means for supporting said housing upon a suitable platform;

casing means for shaving ice particles from a block of ice and dispensing such shavings therefrom;

access means provided with said housing for facilitating service of structure interiorly thereof;

weight means with said access means for providing gravity bias to a block of ice after placement thereof within said housing;

guiding and braking means for controlling the flow of said block of ice within said housing;

discharge means for receiving and dispensing the shaved ice; and said casing means comprising a pair of cast cylindrical members, one of said cylindrical members having discharge means provided therewith, and the other of said castings being provided with replaceable knife blades for shaving ice from the ice block supported thereupon, said blades being mounted parallel to each other along the edge of an ice shaving receiving channel in said casting.

23. The apparatus for shaving ice of claim 22, further provided with a shear strip located adjacent the discharge means in order to help force the shaved ice into said discharge means.

24. Apparatus for shaving ice for making snow cones comprising: an elongatged housing; base means for adjustably supporting said housing vertically upon a suitable platform; casing means mounted vertically within said housing for shaving ice particles from a block of ice; dispensing means for discharging the ice particles from said casing means; guiding and braking means for controlling the flow of said block of ice; and said casing means including a pair of castings; one casting being stationarily mounted on a vertical axis and the other one rotatably mounted about said vertical axis; the rotatably mounted casting having a pair of parallel knife blades therewith for producing ice shavings from the block of ice.

25. The apparatus for shaving ice of claim 24, wherein said base means includes levelling means comprising at least one adjustable leg at at least one corner of said base means, and wherein said base means further includes attaching structure for permanently affixing said base to said platform.

26. The apparatus for shaving ice of claim 24, wherein the rotatable casting provided with the knife blades has a tapered outlet with wiper wing at the end thereof for effecting the flow of ice shavings from the casting as it rotates.

27. The apparatus for shaving ice of claim 24, wherein said knife blades is affixed to a mounting block which in turn is fastened to said rotatable casting.

28. The apparatus for shaving ice of claim 24, wherein said casing means includes liquid catching means.

29. The apparatus for shaving ice of claim 28, wherein said liquid catching means includes said stationary casting having a raised rim around the central axis thereof; and said rotatable casting having a circular groove around the central axis thereof for complementary reception of the raised rim therewithin.

30. The apparatus for shaving ice of claim 22, wherein said housing includes an ice house, and said guiding and braking means includes a plurality of elements mounted with said ice house for guiding the flow of the ice block in the vertical direction within said elongated housing.

31. The apparatus for shaving ice of claim 30, wherein said brake means further includes an adjustable control for moving at least one of said elements inwardly and outwardly to apply and reduce pressure on said vertically moving ice block.

* * * * *